(12) United States Patent
Giamati

(10) Patent No.: US 7,546,980 B2
(45) Date of Patent: Jun. 16, 2009

(54) AIRCRAFT WING WITH ELECTROTHERMAL DEICING AND/OR ANTI-ICING DEVICE

(75) Inventor: Michael J. Giamati, Akron, OH (US)

(73) Assignee: Goodrich Corporation, Charlotte, NC (US)

( * ) Notice: Subject to any disclaimer, the term of this patent is extended or adjusted under 35 U.S.C. 154(b) by 136 days.

(21) Appl. No.: 11/770,781

(22) Filed: Jun. 29, 2007

(65) Prior Publication Data

US 2008/0029648 A1 Feb. 7, 2008

(51) Int. Cl.
*B64D 15/12* (2006.01)
(52) U.S. Cl. .................................. 244/134 D
(58) Field of Classification Search ............. 244/134 R, 244/134 B, 134 D; 60/39.093
See application file for complete search history.

(56) References Cited

U.S. PATENT DOCUMENTS

| | | | | |
|---|---|---|---|---|
| 2,599,059 | A * | 6/1952 | Jones ...................... | 244/134 D |
| 3,013,752 | A * | 12/1961 | Rush ....................... | 244/134 R |
| 3,363,859 | A | 1/1968 | Watts | |
| 3,917,193 | A | 11/1975 | Runnels, Jr. | |
| 4,099,691 | A | 7/1978 | Swanson et al. | |
| 4,358,075 | A | 11/1982 | Antonov | |
| 4,445,655 | A | 5/1984 | Hueberger | |
| 5,074,497 | A * | 12/1991 | Phillips, II ............... | 244/134 D |
| 5,114,100 | A | 5/1992 | Rudolph et al. | |
| 5,158,252 | A | 10/1992 | Sakurai | |
| 5,657,951 | A | 8/1997 | Giamati | |
| 5,971,323 | A * | 10/1999 | Rauch et al. ............. | 244/134 D |
| 6,196,500 | B1 * | 3/2001 | Al-Khalil et al. ........ | 244/134 R |
| 6,338,455 | B1 | 1/2002 | Rauch et al. | |

OTHER PUBLICATIONS

FR0502107; Search Report dated Sep. 14, 2007.

\* cited by examiner

*Primary Examiner*—Rob Swiatek
(74) *Attorney, Agent, or Firm*—Renner, Otto, Boisselle & Sklar

(57) ABSTRACT

An aircraft wing (12) comprising a structural member (20) forming the wing's leading edge skin, a Kreuger flap (16) which moves relative to the structural member (20) between a stowed position and a deployed position, and an electrothermal device (34) mounted (e.g., internally mounted) to the structural member (20). An aft portion (30) of the structural member (20) is curved inwardly to form a recess (32), and a fore portion (18) of the flap (16) fits within the notch (32) to form a joggle therebetween. The electrothermal device (34) is a deicing and/or anti-icing device which continuously provides heat to the curved aft portion (30) of the structural member (20) during icing conditions so as to prevent deployment-inhibiting ice buildup on the flap (16).

18 Claims, 4 Drawing Sheets

AIRCRAFT WING WITH ELECTROTHERMAL DEICING AND/OR ANTI-ICING DEVICE

RELATED APPLICATIONS

This application claims priority under 35 U.S.C. §120 to U.S. patent application Ser. No. 11/057,508 filed on Feb. 14, 2005, (now U.S. Pat. No. 7,278,610 issued on Oct. 9, 2007), which claimed priority under 35 U.S.C. §119(e) to U.S. Provisional Patent Application No. 60/549,752 filed on Mar. 3, 2004.

FIELD OF THE INVENTION

This invention relates generally, as indicated, to an aircraft wing with an electrothermal deicing/anti-icing device and, more particularly, to an aircraft wing having a leading edge flap and an electrothermal device to insure proper deployment of the flap in icing conditions.

BACKGROUND OF THE INVENTION

An aircraft wing is specifically designed to provide the necessary lift to carry the weight of the aircraft at desired speeds and/or altitudes. At high cruising speeds, the required airfoil area is significantly less than that required at slow landing speeds. For this reason, it is common for an aircraft wing to include a leading edge flap (often called a Kreuger flap) which moves between a stowed position, for high cruising speeds, and a deployed position for slow landing speeds. In the stowed position, the leading edge flap lies flush with, or forms a portion of, the lower surface of the wing. In the deployed position, the flap is pivoted outwardly to form a virtual extension of the convex upper surface of the wing so as to increase airfoil area.

It is important that the leading edge flap deploy at the appropriate time during flight, even in cold climate conditions where icing is inevitable. If ice-build up occurs over a portion of the flap (such as a fore portion, which can be the most ice-susceptible portion), it can prevent proper deployment of the flap. Moreover, the flap is often constructed from a thin composite structure, whereby such ice buildup could result in destruction of the flap during an attempted deployment.

SUMMARY OF THE INVENTION

The present invention provides an aircraft wing which is especially suited to prevent ice-build up over a fore portion of a movable flap, as well as other ice-susceptible sections of the wing.

More particularly, the present invention provides an aircraft wing comprising a structural member forming the wing's leading edge skin, a flap which moves relative to the structural member between a stowed position and a deployed position, and an electrothermal device mounted (e.g., internally mounted) to the structural member. The aft portion of the wing's structural member is curved inwardly to form a notch, and the fore portion of the flap fits within the notch to form a joggle therebetween. The electrothermal device provides heat to the aft portion of the structural member during icing conditions, thereby protecting the moveable flap against any ice build-up that would prevent deployment. The electrothermal device can provide the wing with deicing and anti-icing zones, or it can provide only anti-icing zones.

The heating of the aft portion of the structural member can be accomplished by providing an anti-icing zone in the notch area, which is continuously heated to prevent flap-deployment-inhibiting ice formation. The anti-icing zone and the joggle geometry prevent runback (i.e., melted ice running backwardly) from refreezing on unheated aft areas of the wing. Specifically, the notch acts as a heated gutter which routes the runback liquid spanwise for emission into the passing airstream. The joggle geometry also allows attachment fasteners to be moved out of the ice impingement zone; a significant advantage in that such fasteners are often metal screws which unfortunately double as ice anchors because of their heat capacity characteristics. Furthermore, the joggle geometry can result in the elimination of a nut-plate for the lower row of attachment fasteners.

The electrothermal device can also be designed to include one or more zones adjacent the notch's anti-icing zone to compensate for any actuation delay. An actuation delay is the time it takes for an automatic ice detector to react to an icing condition and provide an "on" signal. For example, a short delay (e.g., fifteen seconds) can occur when the deicing/anti-icing device has been in an off mode during flight and the aircraft suddenly enters an icing cloud. A long delay (e.g., two minutes) can occur when an automatic ice detection system fails and the pilot does not immediately realize that the aircraft is in an icing condition. In any event, an actuation delay can result in an ice cap forming between the structural member and the moveable flap portion. If icing conditions are comparably cold and/or the delay is relatively long, the notch's anti-icing zone may not be able to completely melt the ice cap. The adjacent deicing and/or anti-icing zone(s) can be activated simultaneously or sequentially to provide relatively warm runback water to the partially melted ice cap. Additionally or alternatively, the flap can be deployed slightly to remove the partially melted ice cap and then returned to its stowed position.

If the aircraft has a large wing sweep angle (e.g., greater than 30°), the electrothermal device can be designed to provide a primary deicing zone which underlies a major percentage of the surface area of the structural member, including the apex of the structural member. An upper deicing "catch" zone can be provided, which is positioned and operated to prevent runback refreeze on unheated upper aft surfaces of the wing. Specifically, as runback (i.e., melted ice) flows in the aft direction from the primary deicing zone, it refreezes in the catch zone and can then be shed therefrom by activation of this secondary deicing zone.

If the aircraft does not have a large wing sweep angle, the electrothermal device can be designed to provide an anti-icing spanwise parting strip disposed near the apex of the structural member that continuously maintains this area above freezing. Additionally or alternatively, the electrothermal device can provide three upper deicing zones which are independently controllable. Under certain conditions (e.g., high angles of attack), the foremost deicing zones can be operated at the same interval and the aft deicing zone can be operated at intervals to prevent runback refreeze. Under other conditions (e.g., low angles of attack), the upper deicing zones can be operated at overlapping intervals.

These and other features of the invention are fully described and particularly pointed out in the claims. The following description and annexed drawings set forth in detail certain illustrative embodiments of the invention, these embodiment being indicative of but a few of the various ways in which the principles of the invention may be employed.

DRAWINGS

DETAILED DESCRIPTION

Figure 1:
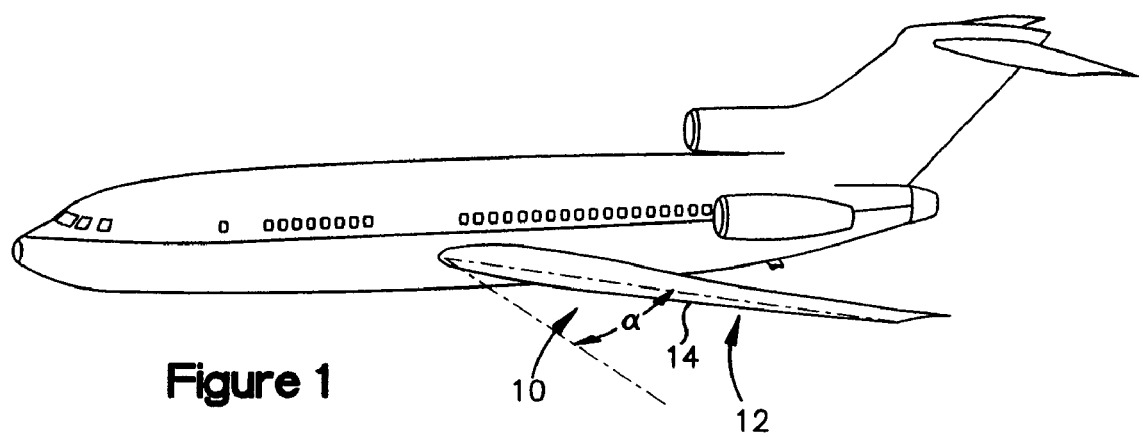
FIG. 1 is a perspective view of an aircraft having aircraft wings according to the present invention.

Referring now to the drawings, and initially to FIG. 1, an aircraft 10 having aircraft wings 12 according to the present invention is shown. In the illustrated embodiment, the aircraft 10 has a sweep angle a which is greater than 30° and, more particularly, about 34°. During flight, air passes over the leading edges 14 of the wings 12 in a fore-to-aft to direction.

Figure 2:
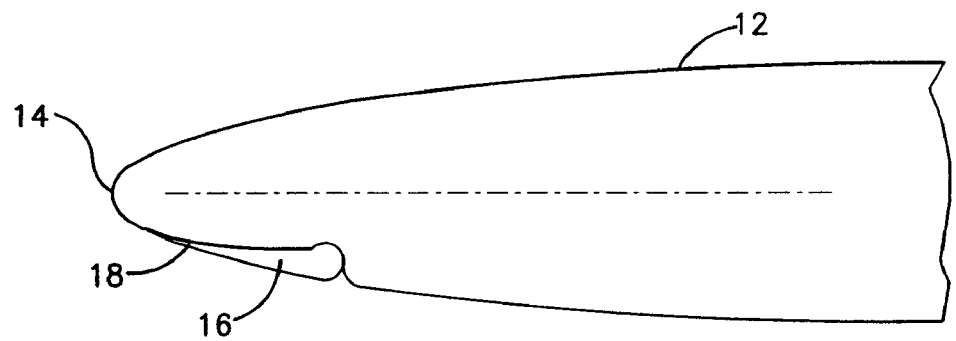
FIGS. 2 and 3 are close-up perspective views of the leading edge of one of the aircraft wings with a moveable flap being shown in a stowed position and a deployed position, respectively.
Figure 3:
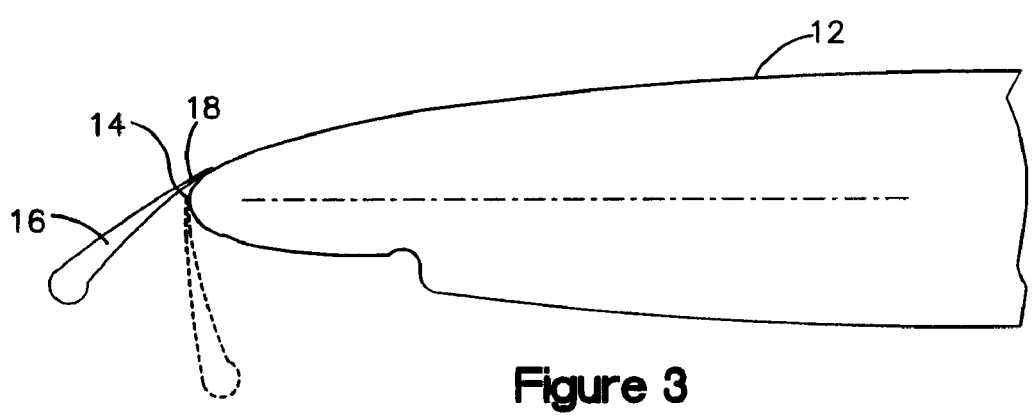

Referring now to FIGS. 2 and 3, each wing 12 includes a rigid flap 16 which moves between a stowed position and a deployed position. In the stowed position, the flap 16 lies flush with, or forms a portion of, the lower surface of the wing 12. (FIG. 2.) In the deployed position, the flap 16 is pivoted outwardly to form in essence an extension of the convex upper surface of the wing 12. (FIG. 3.) (Flap positions between the illustrated stowed/deployed positions are also possible, as is well known in the art.) The flap 16 can comprise a thin composite construction or any other appropriate material. It is noted for future reference that the flap 16 has a fore portion 18 located adjacent to the leading edge 14 of the wing 12 when the flap 16 is in the stowed position. (FIG. 2.)

Figure 4:
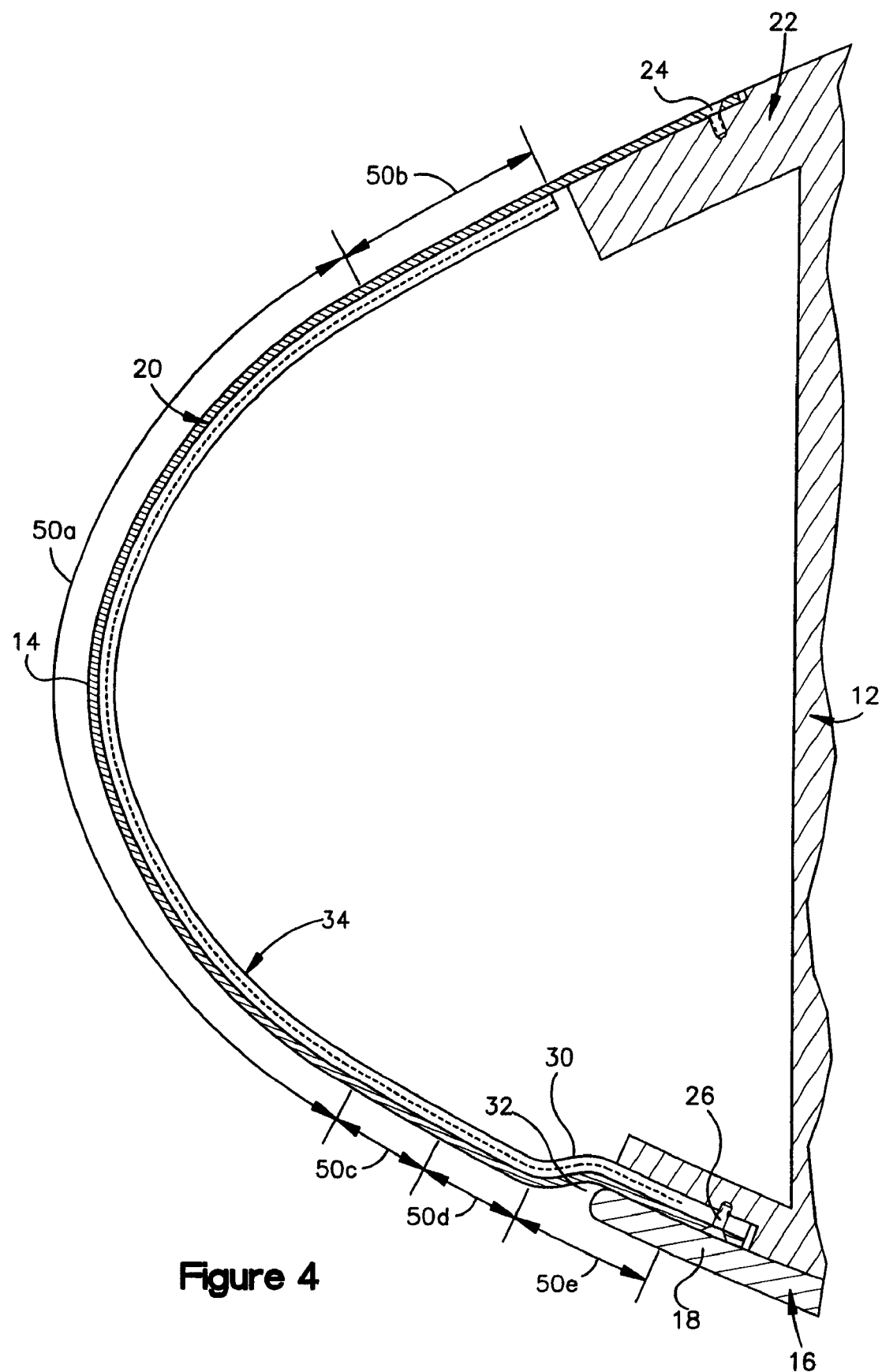
FIG. 4 is a cross-sectional view of the aircraft wing.

Referring now to FIG. 4, the wing 12 includes a structural member 20 forming the leading edge skin and a structural member 22 forming the wing's aft body. The structural members 20 and 22 may be made of a metal (e.g., aluminum), a fiber-reinforced plastic (e.g., fiberglass-reinforced epoxy), or any other suitable material. The upper aft edge of the structural member 20 is joined to an attachment spar of the structural member 22 by suitable means, such as a row of fasteners 24 (e.g., metal flat-head screws). The members 20 and 22 are preferably shaped so that the outer surface of the structural member 20 transitions smoothly into the outer skin surface of the structural member 22.

The lower aft edge of the structural member 20 is joined to the lower attachment spar of the structural member 22 by suitable means, such as a row of fasteners 26 (e.g., metal flat-head screws). The outer surface of the structural member 20 does not transition smoothly into the outer skin surface of the structural member 22 at this lower attachment area. Instead, an aft portion 30 of the structural member 20 is curved inwardly (i.e., towards the chord of the wing 12) to form a relief or recess, also herein referred to as a notch 32. The fore portion 18 of the flap 16 fits within the notch 32 to form a joggle therebetween. Thus, the attachment fasteners 26 are covered by the fore portion 18, whereby these fasteners (which can undesirably function as ice anchors) are positioned away from the ice impingement area. Also, this attachment arrangement eliminates the need for a nut-plate for the lower row of fasteners 26.

Figure 5:
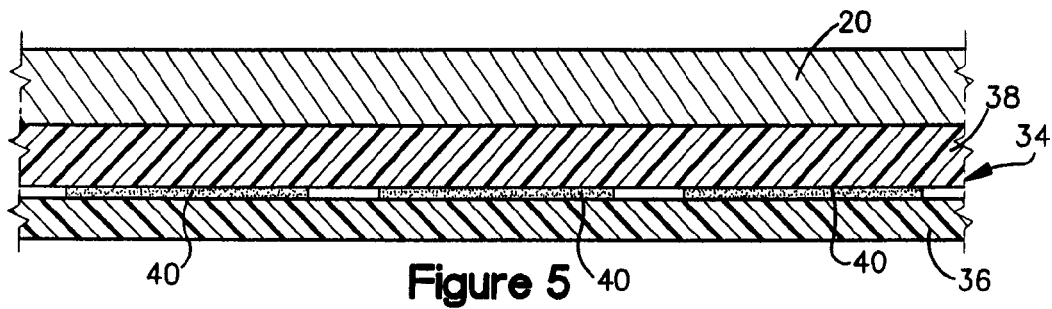
FIG. 5 is an enlarged partial cross-sectional view of the aircraft wing, showing the layers of the wing's electrothermal deicing/anti-icing device.

The wing 12 further includes an electrothermal deicing/anti-icing device 34 which, in the illustrated embodiment, is installed inside the structural member 20. As is best seen by referring briefly to FIG. 5, the deicing/anti-icing device 34 can include an outer electrically-insulating layer 36, an inner electrically-insulating layer 38, and a plurality of heating elements 40 sandwiched therebetween. The insulating layers 36 and 38 can be formed from elastomeric or plastic materials, or from a fiber-reinforced plastic, such as fiberglass or polyester fiber-reinforced epoxy. The various layers and elements of the deicing/anti-icing device 34 can be bonded or otherwise joined together as a unitary structure, and this unitary structure could, in certain situations, include the wing's structural member 20.

Figure 6:
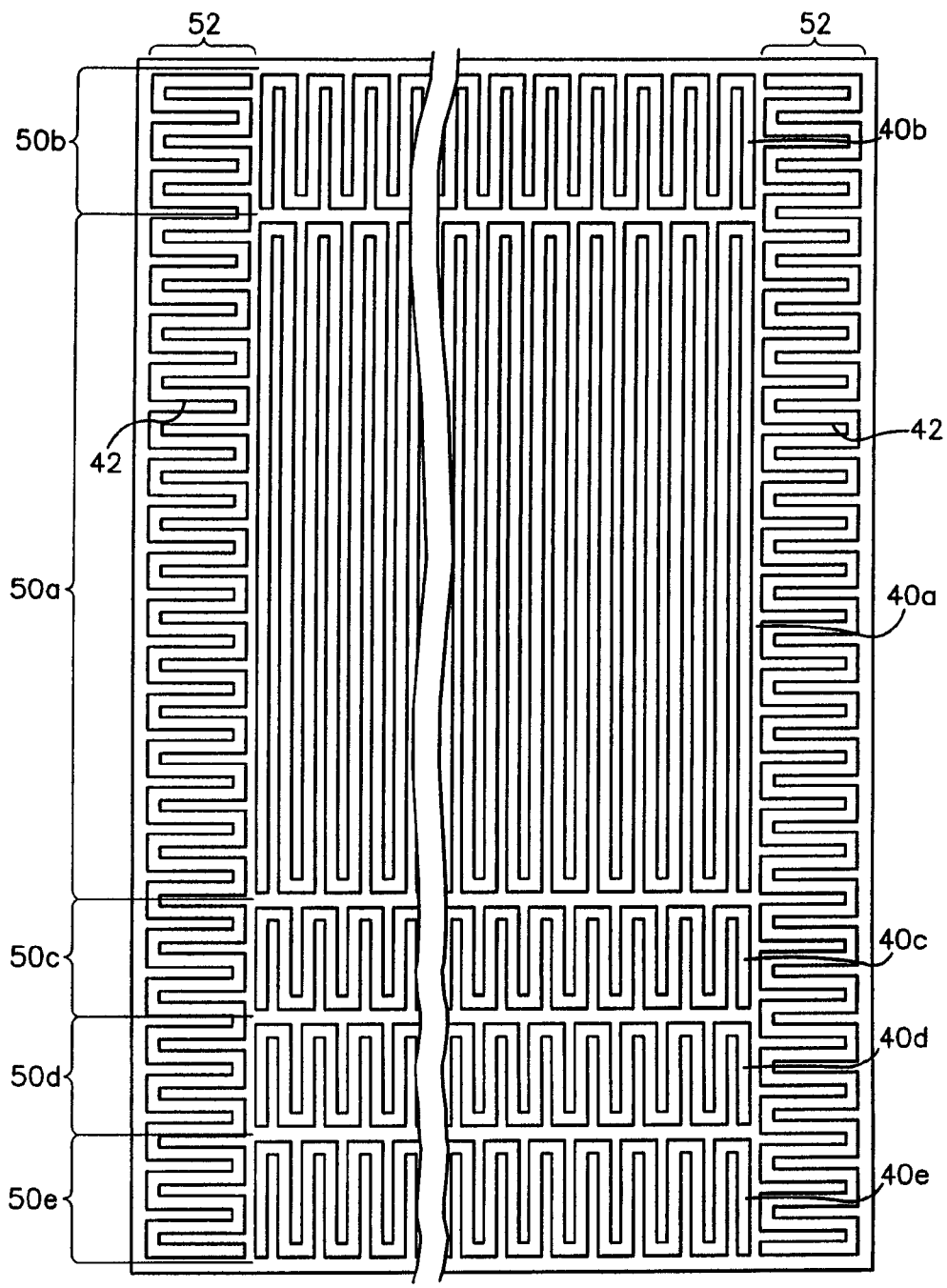
FIG. 6 is a plan view of the heating elements of the electrothermal deicing/anti-icing device.

As is best seen by referring briefly to FIG. 6, the heater elements 40 can be comprised of conductive (e.g., metal) strips, and the desired heat power density can be established by choosing a strip material having appropriate resistance characteristics, by varying strip dimensions, and/or by selecting suitable intra-strip separations. In any event, the heater elements 40a-40e are arranged to define different zones 50a-50e. The deicing/anti-icing device 34 also includes heating elements 42 which define chordwise parting strip zones 52 located at inboard and outboard edges of the wing 12.

Although in the illustrated embodiment each zone 50/52 is created by a single heater element 40/42, multiple intra-zone heating elements are certainly possible with, and contemplated by, the present invention. In any event, the heater elements 40/42 are individually controllable, whereby they can be activated and deactivated at different times.

Referring now back to FIG. 4, the deicing/anti-icing device 34 provides the leading edge 14 of the aircraft wing 12 with deicing zones 50a, 50b, 50c, and 50d and anti-icing zone 50e. During icing conditions, the deicing zones 50a, 50b, 50c and 50d are intermittently activated to remove accumulated ice from the overlying areas of the structural member 20. The anti-icing zone 50e is continually activated during icing conditions to prevent the formation of ice on the overlying area of the structural member 20. The chordwise parting strip zones 52 (not visible in FIG. 4), are also anti-icing zones which are continually activated during icing conditions.

The deicing zone 50a (heating element 40a) underlies a major percentage of the surface area of the structural member 20 and extends over and around its apex. The deicing zone 50b (heating element 40b) underlies the surface area extending from the upper perimeter of the deicing zone 50a to the attachment spar of the structural member 22. The deicing zone 50c (heating element 40c) underlies the surface area extending from the lower perimeter of the deicing zone 50a to about an inch fore of the notch 32. The deicing zone 50d (heating element 40d) extends from the deicing zone 50c to just before the notch 32. The anti-icing zone 50e (heating element 40e) extends from the deicing zone 50d along the notch 32 (and thus is partly coextensive with the stowed flap portion 18) and to the lower aft edge of the structural member 20.

The deicing zone 50a is a primary deicing zone which is intermittently activated to shed accumulated ice. In icing tunnel tests, an anti-icing spanwise parting strip disposed near the apex of the airfoil (which continuously maintains this area above freezing) was not necessary with the aircraft wing 12 of the present invention. The power used for the spanwise parting strip can thereby be saved to compensate for the power used by the anti-icing zone 50e. (FAA rules/guidelines do not require aircraft having wing sweep angles greater than 30° to use an anti-icing spanwise parting strip and, as noted above, the wing sweep angle a for the aircraft 10 is about 34°.)

The deicing zone 50b is used as a catch zone to prevent runback refreeze on the unheated upper aft surfaces of the wing 12. Specifically, runback (i.e., melted ice from the primary deicing zone 50a) is strategically allowed to refreeze in this area and then the deicing zone 50b is activated to shed the build-up of refrozen ice. This zone 50b operates at a low duty cycle based on the amount of runback refreeze. For example, at +4° F., the zone 50b could be cycled on once per every four instances that the primary deicing zone 50a is actuated.

The lower deicing zones 50c and 50d can be activated intermittently with the primary deicing zone 50a, and thus form an extension thereof during normal flight deicing operation. However, they can be activated independently of the primary deicing zone 50a, and of each other, if opposing intervals result in better ice removal and/or more efficient power consumption. As is explained below, independent activation of the deicing zones 50c and 50d are particularly provided to compensate for actuation delays.

The anti-icing zone 50e is continuously activated during icing conditions to prevent an ice build-up that would impede deployment of the movable flap 16 during flight. This anti-icing zone 50e, in combination with the joggle between the flap portion 16 and the notch 32, also control runback routing so as to prevent refreeze in undesirable areas. Specifically, the anti-icing zone 50e warms the notch 32 to define a heated gutter which routes the runback liquid in a spanwise direction for expulsion into the passing airstream. This is especially applicable to aircraft having large wing sweep angles (i.e., greater than 30°) as such sweep angles promote fluid flow in the spanwise direction.

As was indicated above, the deicing zones 50c and 50d are particularly provided to compensate for actuation delays. An actuation delay can result in an ice cap between the structural member 20 and the moveable flap portion 18. Upon actuation of the deicing/anti-icing device 34 after such a delay, the anti-icing zone 50e is activated to melt ice adjacent the notch 32 and/or the flap portion 18. With a short delay (e.g., fifteen seconds) and relatively warm icing conditions, the anti-icing zone 50e may be capable of melting through the ice cap upon activation. However, at colder conditions (+4° F. or lower temperatures) or longer delays, this may not be possible. Instead, the anti-icing zone 50e will only melt away the ice adjacent the structural member 20 thereby creating a hollow cavity under the ice cap. If the hollow cavity fills with air, which is a poor heat transfer medium, further melting of the ice cap becomes more difficult.

According to the present invention the deicing zones 50c and 50d are activated to create warm runback water which flows into the hollow cavity under the ice cap to thereby facilitate further melting. With a short delay (e.g., fifteen seconds), the deicing zone 50c is activated thereby melting ice formed in the corresponding area during the delay and warming the resulting water. This relatively warm water flows aft into the hollow cavity and further melts the ice cap. With a long delay (e.g., two minutes) and a large ice cap, the deicing zone 50d is activated, either simultaneously with the deicing zone 50c or sequentially thereafter, to create more warming water to further melt the ice cap. If normal deicing operation includes dwell times when the other deicing zones are not turned on, these dwell times can be used to cycle the zones 50c and 50d on and off so that there is no overall power increase. Additionally or alternatively, the area covered by the deicing zones 50c and 50d can be divided into three or more zones and sequentially activated to accommodate power draw demands.

In any case, the heating elements 42 in the chordwise parting strip zones 52 (FIG. 4) are turned off (or are not turned immediately on after the actuation delay) to maintain ice in these inboard/outboard areas. If ice is melted in the chordwise zones 52, the runback water can be inclined to flow in the spanwise direction into the airstream without sufficiently warming the deployment-prohibiting ice cap. By not initially heating the chordwise parting strip areas, an ice dam is created which prevents the immediate escape of the warm runback water.

Additionally or alternatively, the flap 16 itself can be used to shed ice from aircraft wing 12. Specifically, the anti-icing zone 50e is used to melt the bond layer between the ice cap and the leading edge skin thereby "loosening" the ice cap to some degree. The flap 16 can be deployed just enough to break the ice away from the wing 12 and then returned to its stowed position.

Once actuation delays have been addressed and any deployment-preventing ice removed from the wing 12, the deicing/anti-icing device 34 can return to (or begin) normal operation for icing conditions.

It is noted at this point that the electrothermal device 34 can instead be designed and/or operated to have only anti-icing zones. Specifically, the zones 50a, 50b, 50c, and 50d would be continually (rather than intermittently) operated to prevent formation of ice on the overlying areas of the structural member 20. In this case, zones 50a and 50b could be combined into one zone, as opposing or different intervals become irrelevant. Zones 50c and 50d could remain independent zones so as to be separately activated to address actuation delays in the anti-icing device 34.

Figure 7:
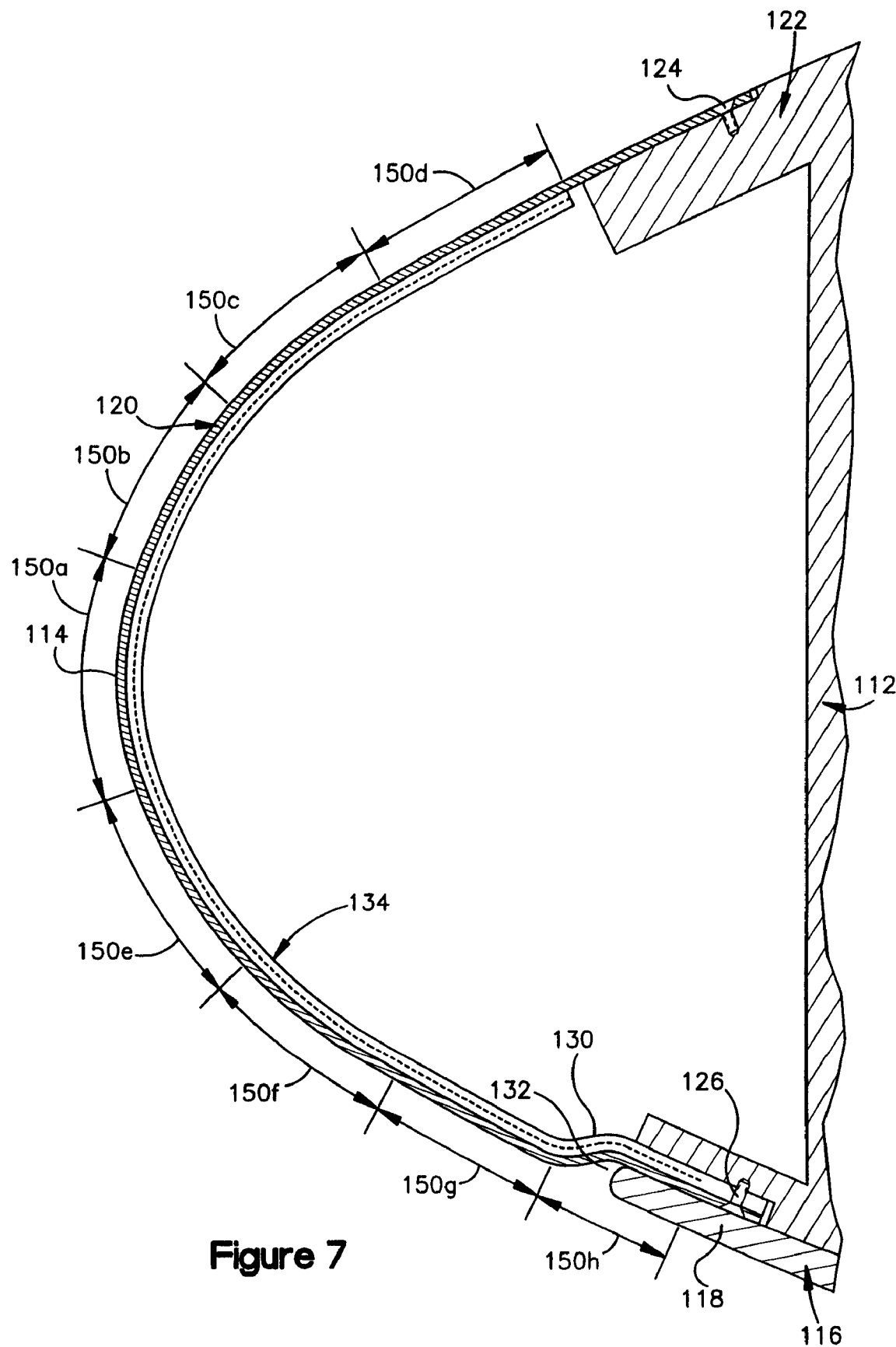
FIG. 7 is a cross-sectional view of another aircraft wing according to the present invention.

Referring now to FIG. 7, another aircraft wing 112 according to the present invention is shown. The wing 112 is similar to the wing 12 in many ways whereby like reference numerals (with a "1" suffix or "100" added thereto) are used to designate like parts. The zoning of the wing 112 is different, however, than the zoning of the wing 12. Specifically, the wing 112 includes an anti-icing zone 150a, three upper deicing zones 150b, 150c, and 150d, three lower deicing zones 150e, 150f and 150g, and a lower anti-deicing zone 150h. The anti-icing zone 150a is a spanwise parting strip disposed near the apex of the airfoil which continuously maintains this area above freezing. Thus, the deicing/anti-icing device 134 can be used on an aircraft where a spanwise parting strip is necessary (e.g., its wing sweep angle is less than 30°) or otherwise desirable.

The deicing zones 150b, 150c, and 150d are three equal-width zones extending sequentially from the upper perimeter of the spanwise parting strip 150a to the aft edge of the leading edge structure 20. When the aircraft is flying at a high angle of attack (e.g., greater than 5°), the zones 150b and 150c can be actuated together to effectively shed ice, and the aft-most zone 150d can be used as a catch zone for runback refreeze, like the zone 50b in the wing 12. However, at a low angle of attack (e.g., 5° or less), there may be some ice impingement on the fore part of the zone 150d which prevents ice from shedding from the zones 150b and 150c. To avoid the power draw required if all three upper deicing zones were actuated together, an overlap cycle can be employed. For example, at +4° F., zones 150b and 150c could be turned on for a certain interval, and then immediately following this interval, zones 150c and 150d could be turned on, to effectively and efficiently shed ice from the upper surface of the wing 112.

The lower deicing zones 150e, 150f and 150g, and the lower anti-icing zone 150h can operate in essentially the same way as the analogous zones (or the lower portion of zone 50a) in the wing 12.

One may now appreciate that the present invention provides an aircraft wing which is especially suited to prevent ice-build up over a fore portion of a movable flap, as well as other ice-susceptible sections of the wing.

The invention claimed is:

1. An airfoil comprising a leading edge structure and an electrothermal device mounted to the leading edge structure;
   the electrothermal device includes at least three sequential upper deicing zones;
   the deicing zones are controllable to heat at opposing intervals, wherein the the two foremost upper deicing zones are heated at the same interval and the aft deicing zone at an opposing interval;
   the deicing zones are also controllable to heat at overlapping intervals.

2. An airfoil as set forth in claim 1, wherein the electrothermal device further comprises a spanwise parting strip on the airfoil's apex area, and wherein the parting strip is controllable to heat the apex area to keep it above freezing.

3. An airfoil as set forth in claim 2, wherein the upper deicing zones extend sequentially from the parting strip in the fore-to-aft direction.

4. An airfoil as set forth in claim 1, wherein the upper deicing zones have equal widths.

5. An aircraft wing comprising the airfoil set forth in claim 1, wherein the aircraft wing has a sweep angle a that is greater than 30°.

6. A method of preventing ice-buildup on the upper surface of the airfoil set forth in claim 1, said method comprising the steps of:
   in one flight condition, controlling the deicing zones to heat at opposing intervals; and
   in another flight condition, controlling the deicing zones to heat at overlapping intervals.

7. A method as set forth in claim 6, wherein the one flight condition comprises a higher angle-of-attack range and the other flight condition comprises a lower angle-of-attack range.

8. A method as set forth in claim 7, wherein the higher angle-of-attack range includes angles greater than 5°.

9. A method as set forth in claim 8, wherein the lower angle-of-attack range includes angles less than 5°.

10. A method as set forth in claim 6, wherein the lower angle-of-attack range includes angles less than 5°.

11. A method as set forth in claim 6, wherein the airfoil is an aircraft wing having a sweep angle α greater than 30°.

12. A method of preventing ice-buildup on the upper surface of an airfoil;
   wherein the airfoil comprising a leading edge structure and an electrothermal device mounted to the structure;
   wherein the electrothermal device includes at least three sequential upper deicing zones which are independently controllable and separately activatable;
   wherein the method comprises the steps of:
      in one flight condition, heating the two foremost upper deicing zones at the same interval and heating the aft deicing zone at opposing intervals to prevent runback refreeze on unheated upper aft surfaces; and
      in another flight condition, heating the at least three deicing zones at overlapping intervals.

13. A method as set forth in claim 12, wherein the one flight condition comprises a higher angle-of-attack range and the other flight condition comprises a lower angle-of-attack range.

14. A method as set forth in claim 12, wherein the higher angle-of-attack range includes angles greater than 5°.

15. A method as set forth in claim 14, wherein the lower angle-of-attack range includes angles less than 5°.

16. A method as set forth in claim 12, wherein the lower angle-of-attack range includes angles less than 5°.

17. A method as set forth in claim 12, wherein the electrothermal device includes a spanwise parting strip zone on the airfoil's apex area, and wherein the method includes the step of continuously maintaining this area above freezing.

18. A method as set forth in claim 17, wherein the upper deicing zones extend sequentially from the parting strip in the fore-to-aft direction.

* * * * *

UNITED STATES PATENT AND TRADEMARK OFFICE
CERTIFICATE OF CORRECTION

PATENT NO. : 7,546,980 B2  
APPLICATION NO. : 11/770781  
DATED : June 16, 2009  
INVENTOR(S) : Michael J. Giamati Page 1 of 1

It is certified that error appears in the above-identified patent and that said Letters Patent is hereby corrected as shown below:

Col. 7, claim 5, line 30, "angle a" should read --angle $\alpha$--.

Signed and Sealed this
Fourth Day of January, 2011

David J. Kappos
*Director of the United States Patent and Trademark Office*